US007062877B1

(12) United States Patent
Koch, III

(10) Patent No.: US 7,062,877 B1
(45) Date of Patent: Jun. 20, 2006

(54) FISHING TIP-UP

(76) Inventor: Stanley G. Koch, III, 1340 Sun Oil Rd., Gladwin, MI (US) 48624

( * ) Notice: Subject to any disclaimer, the term of this patent is extended or adjusted under 35 U.S.C. 154(b) by 0 days.

(21) Appl. No.: 11/184,760

(22) Filed: Aug. 22, 2005

Related U.S. Application Data

(63) Continuation-in-part of application No. 10/801,876, filed on Mar. 16, 2004, now abandoned.

(60) Provisional application No. 60/529,168, filed on Dec. 12, 2003.

(51) Int. Cl.
*A01K 97/10* (2006.01)

(52) U.S. Cl. .............................. 43/19.2; 43/17

(58) Field of Classification Search ............... 43/19.2, 43/16–17

See application file for complete search history.

(56) References Cited

U.S. PATENT DOCUMENTS

| 594,609 | A | * | 11/1897 | Dodge | 43/17 |
| 1,995,067 | A | * | 3/1935 | Killory | 43/16 |
| 3,060,616 | A | * | 10/1962 | Woodley | 43/17 |
| 3,187,456 | A | * | 6/1965 | Apitz | 43/17 |
| 4,373,287 | A | | 2/1983 | Grahl | |
| 4,522,572 | A | * | 6/1985 | Hahn | 43/16 |
| 4,567,686 | A | | 2/1986 | Akom | |

* cited by examiner

*Primary Examiner*—Teri Pham Luu
*Assistant Examiner*—Kimberly S. Smith
(74) *Attorney, Agent, or Firm*—Rober L. McKellar; McKellar IP Law, PLLC

(57) ABSTRACT

The present invention is an ice fishing device that is completely self-contained, collapsible and its jigging action is completely wind driven. The tip-up is a complete fishing device. It can be assembled and collapsed with relative ease for quick usage or quick storage. The flexible riser is erected at an angle that allows the wind to give the bait a natural up and down jigging motion.

10 Claims, 11 Drawing Sheets

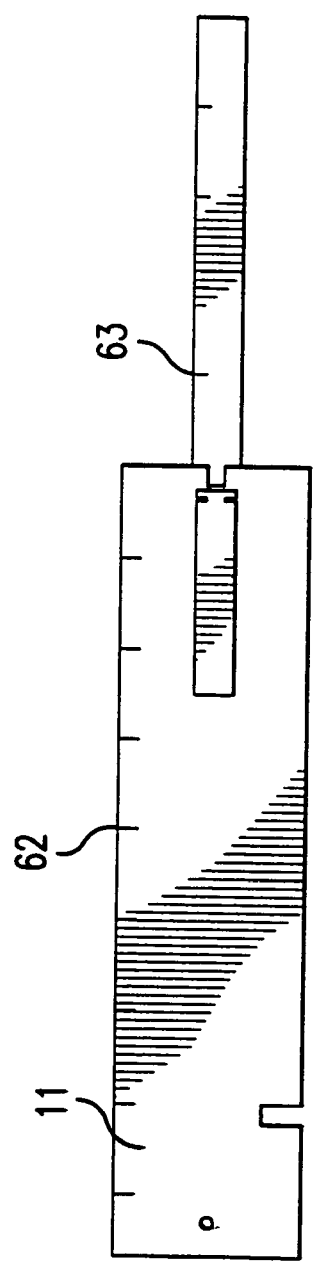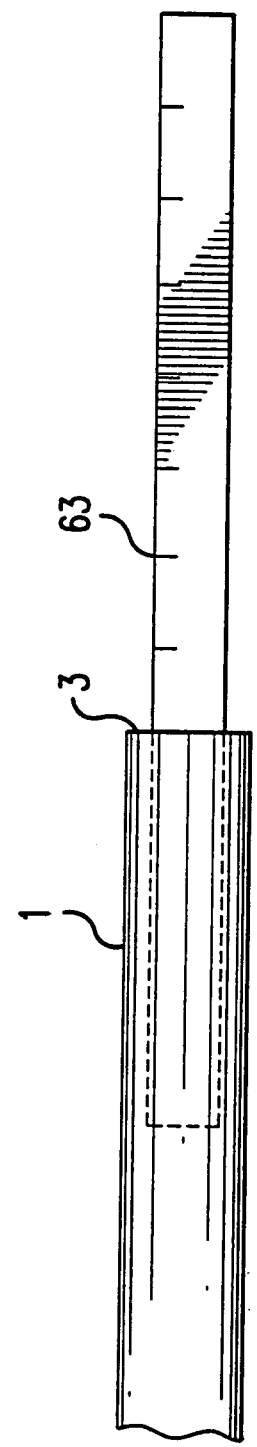

FISHING TIP-UP

This application is a continuation-in-part application of U.S. patent application Ser. No. 10/801,876, filed on Mar. 16, 2004, now abandoned which is an original U.S. Patent application of U.S. Provisional patent application 60/529,168, filed Dec. 12, 2003.

The present invention deals with a tip-up that has many improvements over existing ice fishing tip-ups.

BACKGROUND OF THE INVENTION

The present invention relates to the winter sport of ice fishing and a device for that activity. There is an advantage to be able to conveniently and quickly assemble and disassemble ice fishing equipment. Moreover, it is advantageous to have a natural jigging motion of the bait to entice the fish that is sought. Examples of improvements in the instant invention include a flexible riser that provides a jigging action without springs; an assembly that provides the tip-up with a lower center of gravity than other jigging tip-ups; line freeze protection; self adjusting ice shield; a reel locking mechanism; line free flow, among other advantages that will become evident from the following specification. The prior art has laid claim to some of these advantages, however, most have not sought to combine all these elements to make a truly all in one device. In U.S. Pat. No. 4,567,686 issued to Akom on Feb. 4, 1986 there is disclosed a device that is collapsible, provides a wind scoop that is spring loaded and, a spring action that is triggered after the reel moves, moving a lever that activates a flag for strike indication.

Another example of a prior art device is U.S. Pat. No. 4,373,287 issued to Grahl on Feb. 15, 1983, giving reference to a wind driven jigging tip such as Akom. There are clear distinctions between Grahl and the present invention.

THE INVENTION

What is disclosed and claimed herein is a tip-up for ice fishing comprising in combination; a base, wherein the base has a distal end and a near end and has mounted on the base, near the distal end, a cross member. The cross member has a median point and the cross member has attached at the median point, a slidable bracket that is slidable along the base. The cross member is capable of locking to the base at the distal end of the base.

There is a flexible riser mounted near the near end of the base, the flexible riser has a top surface, a bottom surface, a near end and a distal end and the near end of the flexible riser is provided with a pull tab locking notch.

There is a pull tab erector mounted on the top surface of the flexible riser. The pull tab erector has a near end, a distal end, a first side, a second side, a top surface and a bottom surface. The bottom surface, at the distal end of the pull tab erector, is attached to the top surface of the flexible riser. The near end of the pull tab erector is notched on the first side and the second side to fit into the near end of the pull tab erector notch. The pull tab erector is extended to fit into the flexible riser near end locking notch.

There is a rotatable reel with a rotatable spool surmounted essentially at the distal end of the pull tab erector, the reel having an outer casing. The outer casing has an outer surface, an inner surface, a near end; a distal end, an opening therethrough, and a reel handle lock in the near end of the outer casing. There is a removable inner core having a near end and a distal end. There is a handle mounted to the near end of the inner core and the inner core distal end is tapered to the end. The tapered surface has a groove in it. The inner core has two circular protrusions that ride on the inner surface of the outer casing and the rotatable reel has the ability to swing inward at least 90° when the handle is in the up position. Between the two circular protrusions is a notch that is used to limit the amount of line that can free flow from the reel as desired.

The reel inner core is removable and the inner core is confined to the inner surface of the reel by the reel core lock. The reel core lock is mounted to the outer surface of the reel. The reel core lock has a top surface, a bottom surface, a distal end, and a near end forming a tab. There is an opening through the top surface of the reel core lock.

A reel stop/lock is mounted near the distal end of the outer casing of the reel to prevent the reel from rotating more than 90° and locking it in both positions, that is, the storage position and the deployed position.

There is mounted on the flexible riser essentially at its median point and near the second side, a flexible flag. There is also present, a notch in the flexible riser above the flexible flag to provide storage for the flexible flag when the flag is not in use. There is a opening through the distal end of the flexible riser top surface to accommodate a fishing line and the end of the flexible line tube at the distal end of the base that is incorporated with the flexible tube, the flexible tube having a top end and a bottom end, wherein the top end of the flexible tube depends downwardly through an opening through the base and continues through the top surface of the self-adjusting ice shield, the self adjusting ice shield having a top surface, a bottom surface, and an outer edge. The flexible tube passes through a washer wherein the washer has a top surface and a bottom surface, the flexible tube terminating at the bottom surface of the washer and supporting the self adjusting ice shield.

In another embodiment, the invention comprises the means to use a conventional fishing reel with the tip up of this invention, the essence of the embodiment being a reel holder, wherein the reel holder has a distal end and a near end, and the distal end and near ends have a means of attaching the reel holder to the pull tab erector such that the distal end and the near end of the reel holder are parallel and aligned with the distal end and the near end of the base. The reel holder has a unitarily mounted pivot tab adjacent to the near end, the pivot tab having a centered hole in it.

There is a trigger. The trigger has a single coil spring configuration wherein both ends of the coil spring are elongated. The single coil spring is mounted on the pivot tab such that the center of the single coil spring is aligned with the centered hole of the pivot tab, the trigger being mounted with a shouldered pin such that the trigger revolves around the pin.

There is essentially a conventional rotatable reel with a rotatable spool surmounted on the distal end of the pull tab erector, the reel having an upstanding spool bracket on which is mounted a fishing spool for containing fishing line on it. The spool comprises a pair of parallel aligned spaced-apart circular plates that are integrally connected by a hollow spindle shaft member. The reel has a rotatable handle that is attached to the hollow spindle shaft member that is elongated to the extent that it is longer than the diameter of the parallel aligned spaced-apart circular plates.

BRIEF DESCRIPTION OF THE DRAWINGS

FIG. 11 is a top view of flexible riser with slidable graduated measuring scale extended.

FIG. 12 is a top view of the slidable graduated measuring device within the base.

DETAILED DESCRIPTION OF INVENTION

Figure 1:
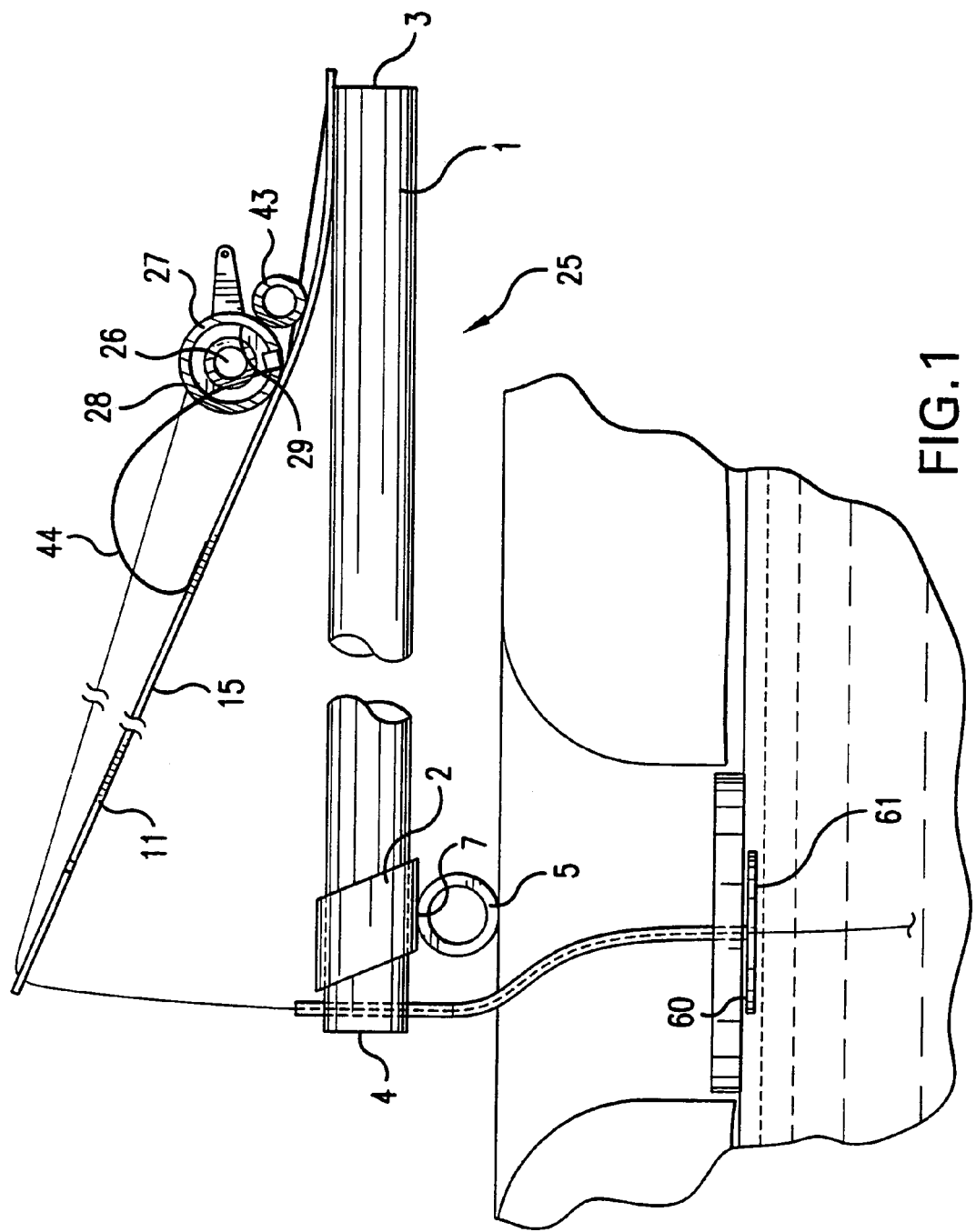
FIG. 1 is a full side view of the inventive tip-up assembled and set.

Reference will now be made to the Figures, specifically with reference to FIG. 1, which is a side view of the inventive tip-up 25 assembled and in the set position. The base 1 has a near end 3 and a distal end 4 and is attached to cross member 5 at its median point 7 (see also FIG. 2) by the slidable bracket 2. Also shown is the bottom surface 15 of flexible riser 11.

Figure 2:
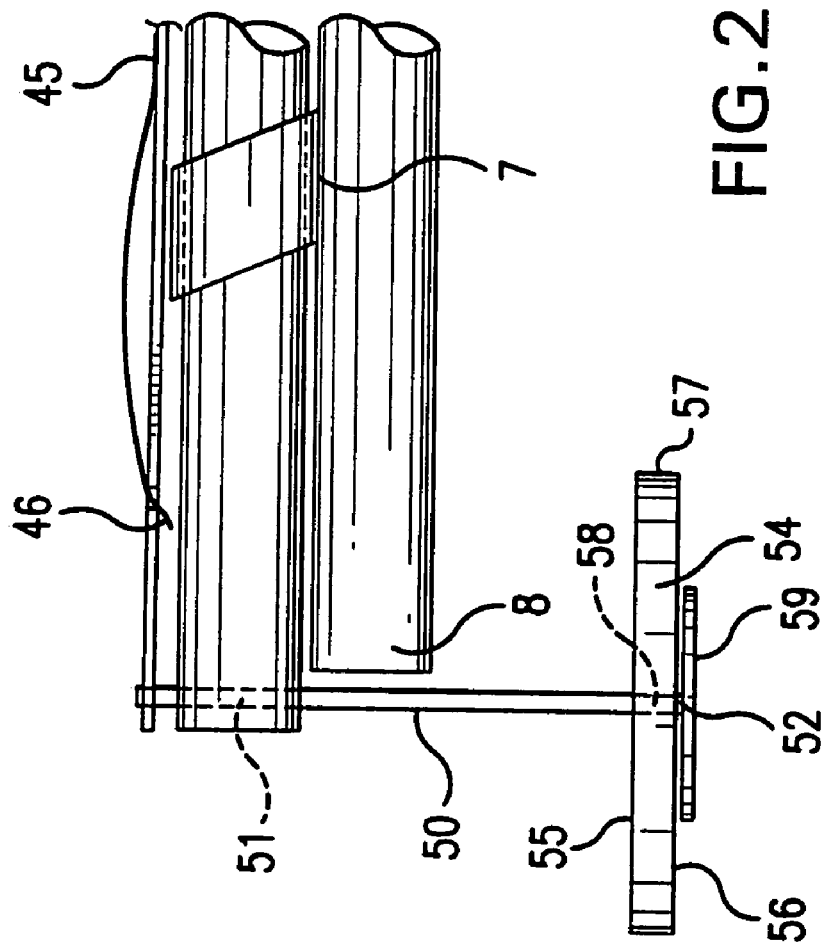
FIG. 2 is a side view of the inventive tip-up collapsed down for storage or transportation.

Now referring to FIG. 2, wherein there is shown a full side view of the inventive tip-up of this invention, in a collapsed state for storage or transportation. The cross member 5 is substantially parallel to the base 1. The near end of the cross member 6 swings essentially 90° to the linear axis of the base 1 and nests under the near end 12 of the flexible riser 11. The flexible riser 11 is attached to the base 1 at the attachment point 16. The bottom surface 24 of the pull tab erector 18 is visible. The distal end of the cross member 8 also swings 90°, however, in the opposite direction nesting under the distal end of the base 4 and adjacent to the flexible tube 50 (line freeze protector).

Figure 3:
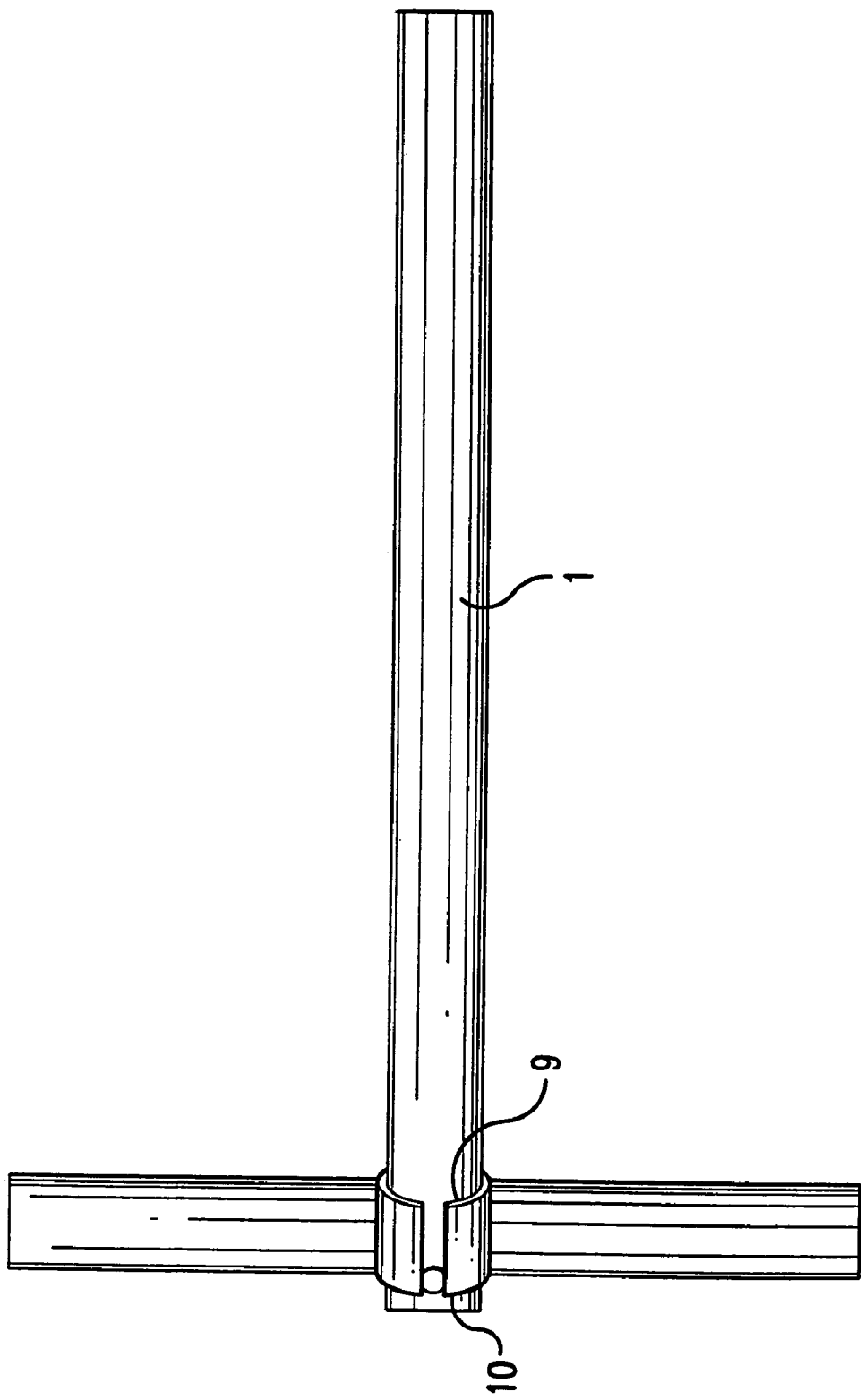
FIG. 3 is a top view of the cross member fully locked in into the locked position.

Now with reference to FIG. 3 which represents a top view of the cross member 5 and a portion of the base 1, wherein the cross member 5 is fully moved to the distal end of the base 4 into the locked position of the distal locking end of the slidable bracket 10. Also shown is the near end of the slidable bracket 9.

Figure 4:
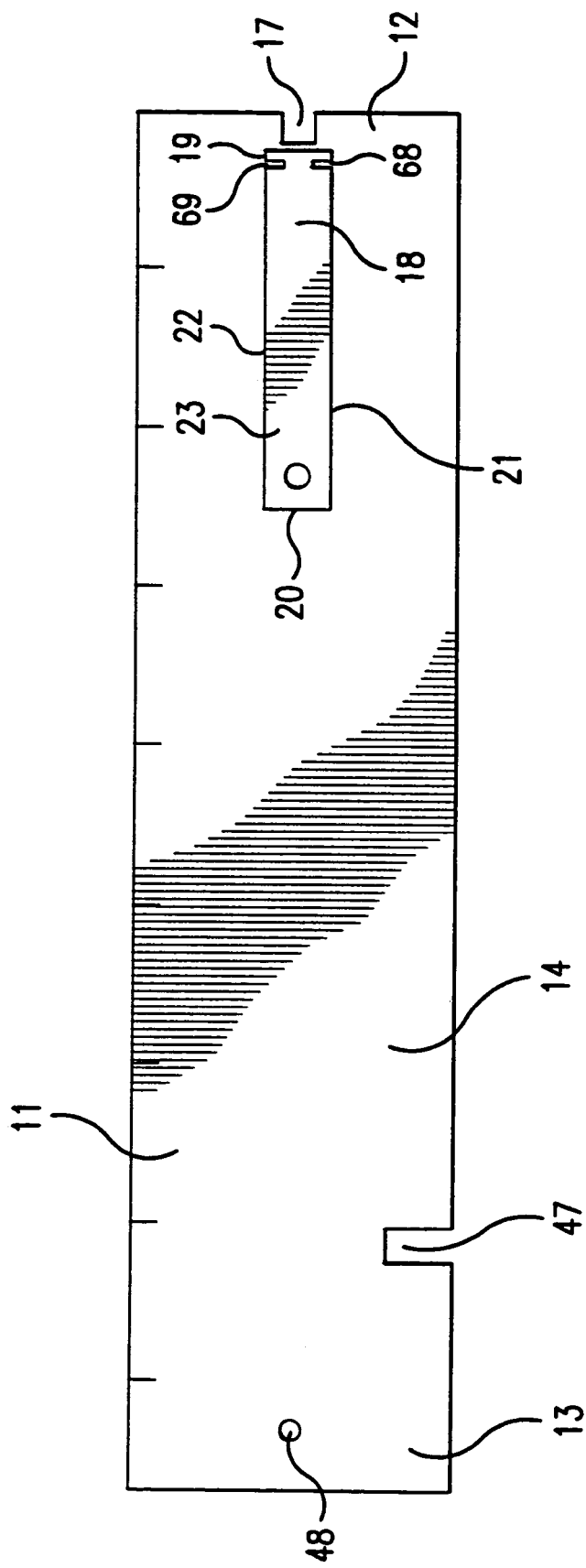
FIG. 4 is a top view of the flexible riser.

FIG. 4 is a full top view of the flexible riser 11. Shown are the near end 12 of the flexible riser 11 and the distal end 13 of the flexible riser. Also present is top surface 14 of the flexible riser 11. In the near end 12 of the flexible riser 11 is the pull tab locking notch 17 of the flexible riser 11 that is present to accept the near end 19 of the pull tab erector 18. The pull tab erector 18 is the locking mechanism for the flexible riser 11. The distal end 20 of the pull tab erector 18 on the bottom surface 24 of the pull tab erector 18 is where it is attached to the flexible riser 11. There is a notch 68 in a first side 21 of the pull tab erector 18 and a notch 69 in the second side 22 of the pull tab erector 18 forming a locking mechanism for the pull tab erector 17. The top surface 23 of the pull tab erector 18 is also present in FIG. 4.

Referencing back to FIG. 1 there is shown a clear side view of the inventive 3Q device herein assembled and set. The rotatable reel is represented by 26. What is meant by rotatable is the ability of the reel to swing essentially 90° which if further illustrated by FIGS. 9 and 10. The rotatable reel consists of an outer casing 27, this outer casing has an outer surface 28 and inner surface 29.

Figure 5:
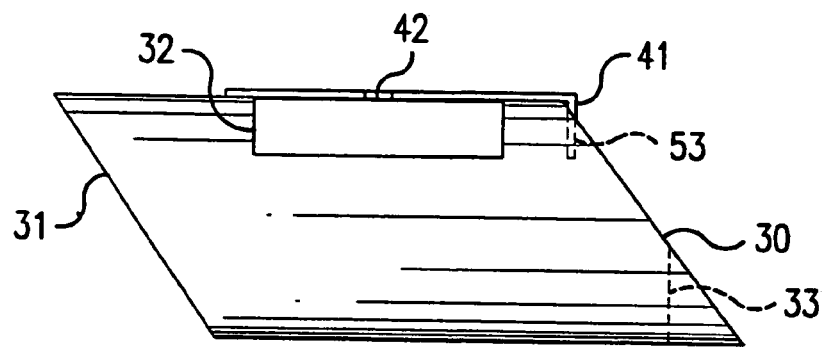
FIG. 5 is front view of the rotatable reel.

With reference to FIG. 5 this is a front view of the rotatable reel. Also present is the near end 30 of the outer casing 28 and the distal end 31 of the outer casing 28. On the top portion 27 of the outer casing 28 is an opening therethrough 32. In the near end 30 of the outer casing 28 is a reel lock 33 which the reel handle 34 will fit securely into, placing the reel in the locked position.

Figure 6:
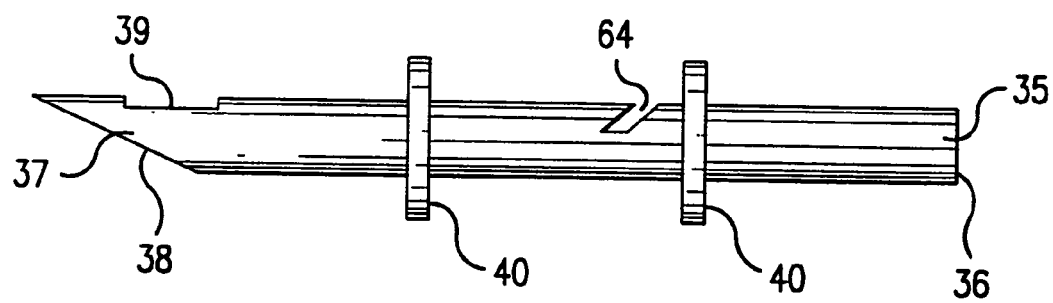
FIG. 6 is a front view of the removable inner core of the rotatable reel.
Figure 7:
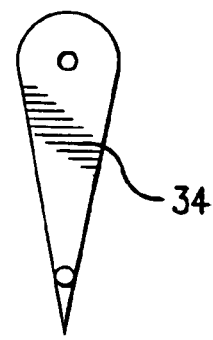
FIG. 7 is a front view of the rotatable reel handle.
Figure 8:
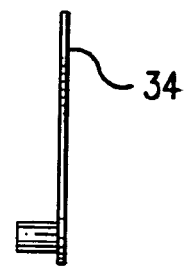
FIG. 8 is a side view of the rotatable reel handle.

Now with reference to FIG. 6 that is a front view of the removable reel inner core 35 of the rotatable reel 26, the near end 36 of the inner core 35 is where the reel handle 34 of FIGS. 7 and 8 is attached. The distal end 37 of the removable reel inner core 35 also incorporates the inner core distal end taper 38 and above that is the inner core distal end grove 39 which retrains the flexible flag 44 until there is reel movement and the flexible flag 44 is released indicating a strike. The inner core circular protrusions 40 enable the removable inner core 35 to rotate within the rotatable reel 26 inner surface 29 of the outer reel casing 28. Between the inner core circular protrusions 40 is the line run out setting notch 64. Also present in FIG. 6 is inner core reel lock 41 which allows the inner core 35 to be easily slid out of the outer casing 27 by simply lifting the tab 53 on the inner reel core lock 41. There is also an opening 42 through the inner reel core lock that acts as a line guide to and from the rotatable reel 26. The removable reel inner core 35 is equipped with a diagonal notch or the adjustable line run out setting notch 64. This allows the angler to preset an amount of line that can be drawn out of the reel before it will stop.

Figure 9:
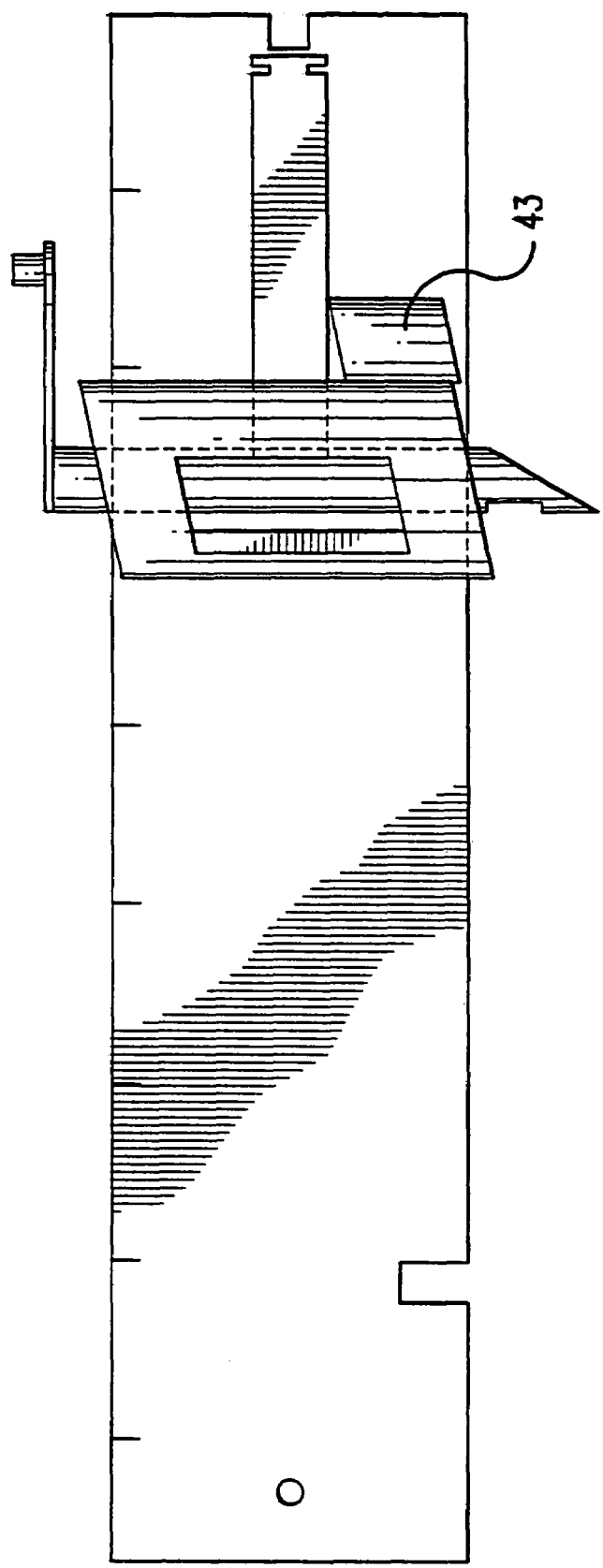
FIG. 9 is a top view of rotatable reel in the deployed or fishing position.

FIG. 9 represents a top view of rotatable reel 26 in the engaged or fishing position. When the tip-up 25 is in the set position the rotatable reel 26 sits perpendicular to the flexible riser 11. Also present is the reel stop/lock 43 which prevents the rotatable reel 26 from swinging more than 90° in either direction.

Figure 10:
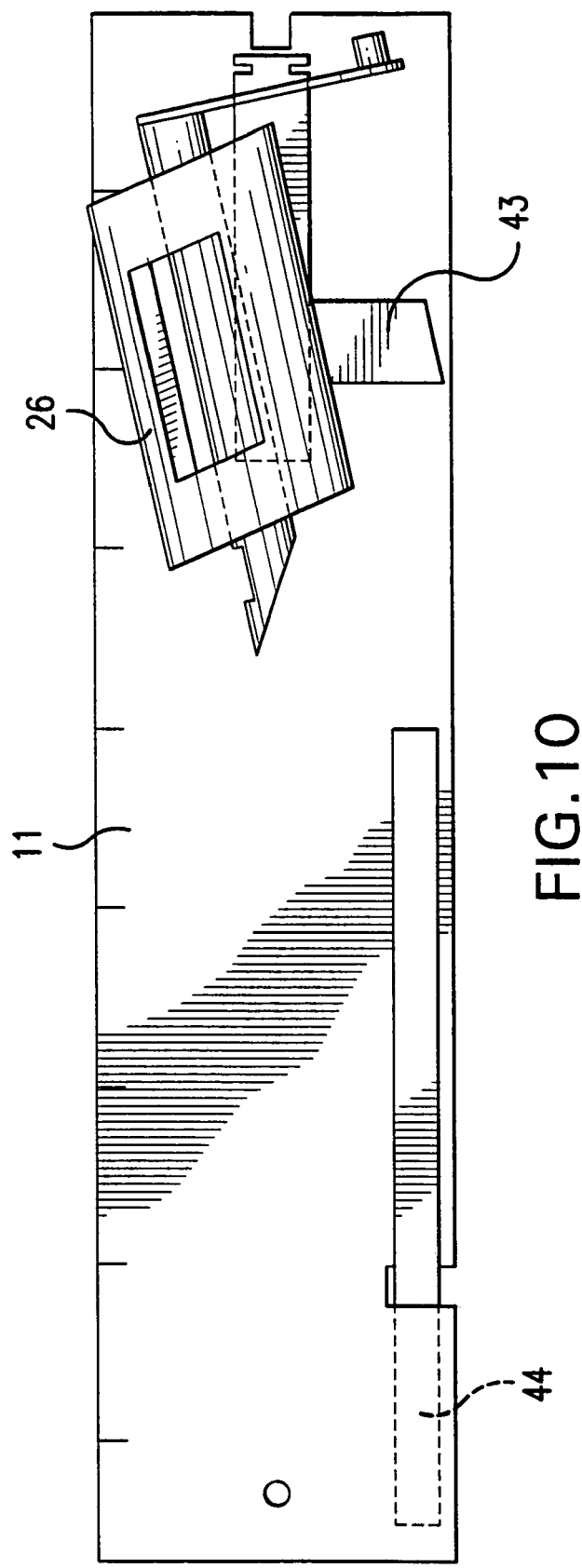
FIG. 10 is a top view of the rotatable reel in the storage position.

FIG. 10 represents a top view of the rotatable reel 26 in the storage position. The rotatable reel 26 swings in to allow for ease and protection in transportation and storage. The flexible flag 44 is also present in the transportation or storage mode. The reel stop/lock 43 is also present here to represent how the rotatable reel 26 collapses to fold essentially inline with the flexible riser 11.

FIG. 11 is a top view of flexible riser 11 with graduated measuring system 62 and slidable measuring system 63 extended from within the base 1.

FIG. 12 is a top view of the slidable graduated measuring system 63 within the base 1.

Referring now to FIGS. 1–12, in FIG. 1 the flexible flag 44 is present in the set position. In FIG. 2 the flexible flag 44 is in the storage position where the near end of 45 the flexible flag is attached to the top surface 14 of the flexible riser 11. The distal end 46 of flexible flag 44 then proceeds through the flexible flag storage notch 47 of the flexible riser 11 of FIG. 4. FIG. 4 also shows the opening therethrough 48 at the distal end 13 of the flexible riser 11. FIG. 2 shows the top end 51 of flexible line tube 50 proceeds through the distal end 4 of the base 1. As it depends downwardly it becomes flexible tube 50 terminating at the bottom end 52 of flexible line tube 50. Also present in FIG. 2 is the self adjusting ice shield 54 which has a desired effect of preventing the fishing hole from freezing. Another effect of the self adjusting ice shield 54 is that it limits the amount of ambient light that is allowed to pass through the opening in the ice which reduces the possibility of alarming the fish. One other aspect of the self adjusting ice shield is that it protects from fluctuations in water level. The self adjusting ice shield 54 has a top surface 55, a bottom surface 56 and an outer edge 57. There is also an opening therethrough 58 to accommodate the flexible tube line protector 50. Attached to the bottom end of the flexible line tube 52 is a washer 59. The washer 59 has top surface 60 which maintains contact with the self adjusting ice shield 54. The bottom surface of the washer 61 is where the flexible line tube 50 terminates and attaches to the washer 59.

The present device is collapsible and all components fall within a very small and simple plane, there are no items that protrude outside the horizontal or linear planes of the flexible riser 11 of the device. The wind activated jigging aspect of the present device is also clearly more efficient in that it does not require springs or a scoop to active. The tension that is placed on the flexible riser 11 by locking it into place with a pull tab erector 18 loads the entire flexible riser 11. In other words, the entire flexible riser 11 itself has spring action.

For example, Grahl has a cantilever design making the tip-up itself top heavy. A good solid strike would tip this device quickly. The construction of the instant invention gives it a lower center of gravity thus not allowing it to give way when struck by a larger fish. Even more central to the comparison is that in Grahl, there is no self adjusting ice shield or flexible tube to protect the line and hole from freezing. There is also the absence of a reel lock. Also not present is the ability to position the reel to automatically allow for the free flow of line from the reel or limit the amount of line that can free flow from the reel. The jigging action in Grahl is once again provided by the action of a spring. As explained supra, when assembled the instant invention's entire flexible riser acts as a spring when correctly set using the pull tab erector. Both Akom and Grahl use wing nuts to tighten and loosen the fasteners for their respective uprights. The instant invention is clearly superior. Also, in the instant invention as discussed infra, simply sliding the slidable bracket toward the distal end of the base and locking it over the grommet, turning the cross member 90°, pulling the pull tab erector to attach to the notch at the near end of the flexible riser, provides a completely erected tip-up.

The strike indicator is also superior because instead of relying on the reel to move and moving another device that in turn releases the flag or strike indicator, there is only one movement of the inventive device herein. The present invention allows the flag or strike indicator to rest directly on a groove that is incorporated in the inner core reel taper. When set correctly, the reel need only move a fraction to activate the strike indicator or the flag. Incorporated within the device is a reel handle and reel lock. Both also can be incorporated to allow either the free flow of line or an automatic locking device. Also present is a flexible tube mounted in the base which will protect the line from freezing. At the terminus of the flexible tube is a self-adjusting ice shield that has not been incorporated into a wind driven jigging tip-up in the manner that is represented by the inventive device herein. The rotatable reel (not the spool of the reel) is another feature not present in Akom, where the reel will turn and lock essentially 90° from the linear axis of the base, thereby protecting the reel during transportation and storage. The reel will also lock when it is in the deployed position.

Figure 13:
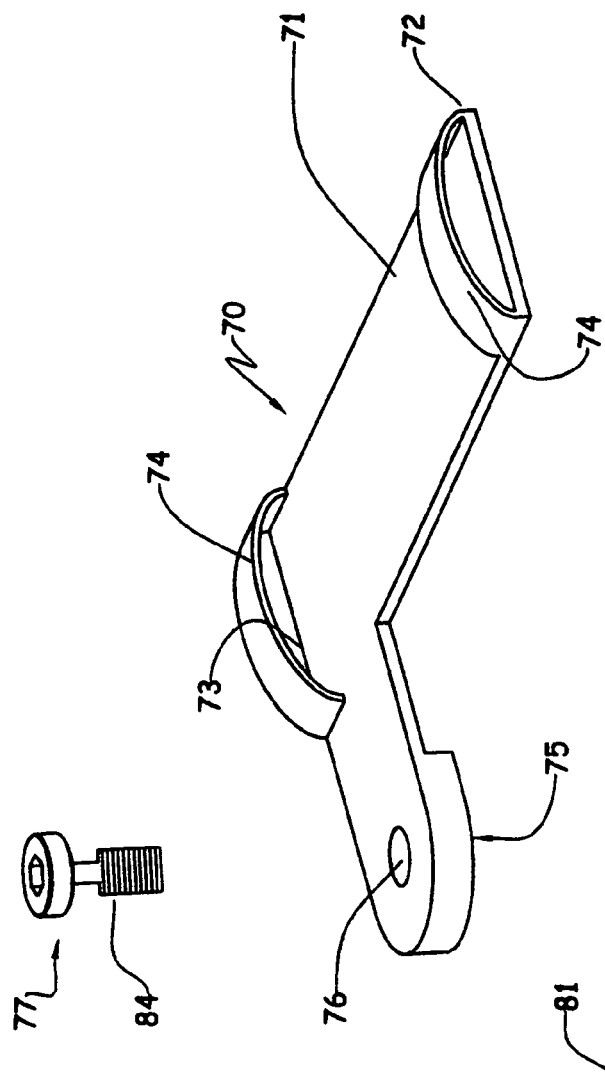
FIG. 13 is a view in perspective of a reel holder.
Figure 14:
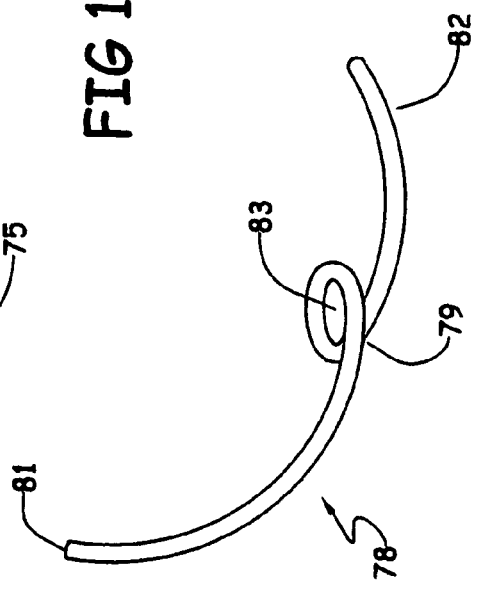
FIG. 14 is a full top view of a trigger.

Turning now to the second embodiment of this invention, and with reference to FIG. 13, there is shown a reel holder 70 that has a flat support base 71, that has a distal end 72 and a near end 73. At the distal end 72 and the near end 73, there are located two straps 74, that are used to attach the reel holder 70 to the pull tab erector 18 and also to hold the reel 80 in place on the tip up.

The reel holder 70 has a pivot tab 75, which pivot tab 75 is integrally mounted adjacent the near end 73 of the reel holder 70. The pivot tab 75 has centered hole 76 in it to receive a shouldered pin 77.

There is a trigger 78 that is essentially a single coil spring 79 having elongated ends 81 and 82, the use of which will be discussed infra. The trigger 78 is mounted on top of the reel holder 70 such that the center 83 of the single coil is aligned with the centered hole 76 of the reel holder 70 and the two are fixed by the shouldered pin 77, such that the trigger 78 will revolve around the shoulder 84 of the shouldered pin 77.

It should be noted that the trigger 78 is mounted on the pivot tab 75 such that the elongated end 82 (which is the bottom of the trigger 78) is below the elongated end 81 of the trigger 78. This is so the elongated end 82 will pass under the reel holder base 71 and the pull tab erector 18 and extend on the back side of the reel holder 70, and have the ability to contact the rotatable handle of the reel 80.

Figure 15:
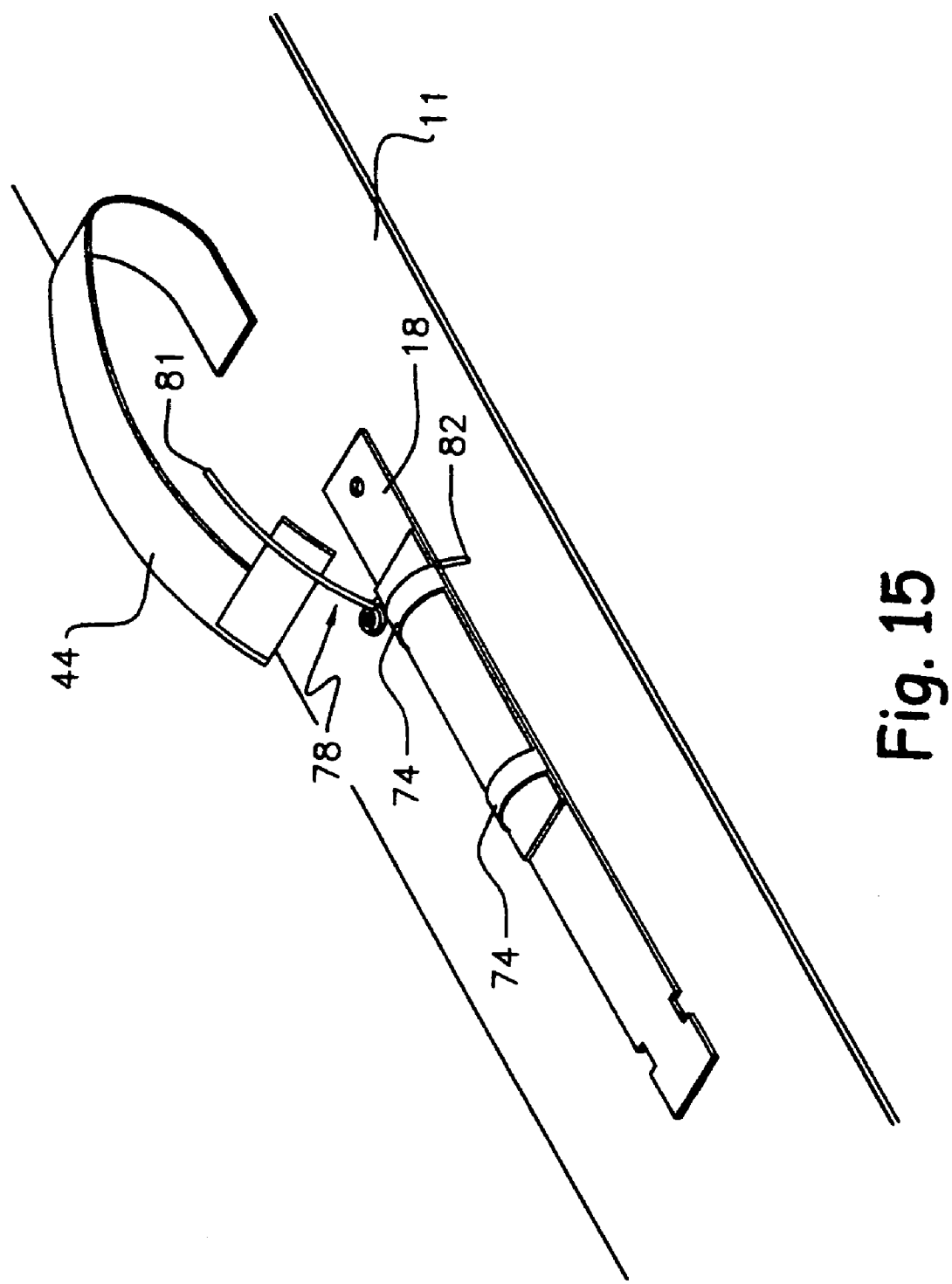
FIG. 15 is a view in perspective of a portion of the tip up showing the second embodiment of the reel holder and trigger holding the flag mechanism down.

FIG. 15 is a view in perspective of a portion of the tip up showing the flexible riser 11, the pull tab erector 18, the reel holder 70 mounted on the pull tab erector 18, the trigger 78, the flexible flag 44, bent over and placed under the elongated end 81 to hold the flexible flag 44 in place.

Figure 16:
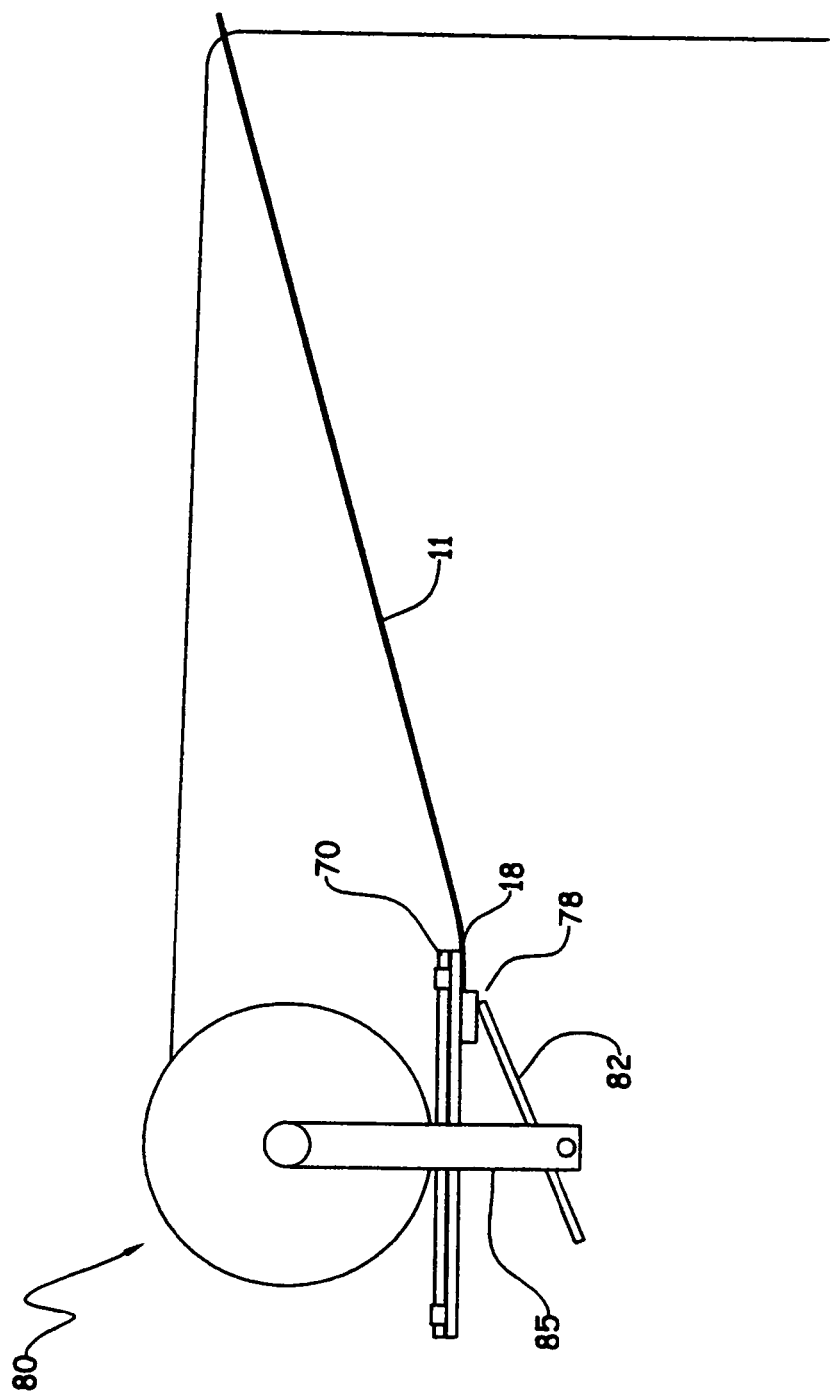
FIG. 16 is a side view of the second embodiment of the invention showing the placement of the reel on the reel holder and the placement of the trigger relative to the rotatable handle of the reel.

Turning to FIG. 16, there is shown a portion of the tip up to illustrate the placement of the reel holder 70, the reel 80, the trigger 78, the elongated handle 85 of the reel 80.

In operation, the fishing line is set at the depth that the fisherman desires. The reel 70 is turned until the elongated handle 85 is pointed downwardly and the elongated end 82 is placed against the handle 85. When a fish strikes and the line moves outwardly, the reel 80 turns forward, and the elongated handle 85 initially moves backwardly, striking the elongated end 82 of the trigger 78 which revolves around the shouldered pin 77, thus moving the elongated end 81, and releasing the flexible flag 11 to indicate the strike.

These ice fishing devices are completely self-contained, collapsible and the jigging action is completely wind driven. These tip-ups are complete fishing devices. They can be assembled and collapsed with relative ease for quick usage or quick storage. The flexible riser is erected at an angle that allows the wind to give the bait a natural up and down jigging motion. Also the reel can be positioned so line can flow out automatically when the bait is struck, which is also desired for some types of fishing. For quick assembly, the cross member slides forward and backward on the base allowing it to fold neatly underneath the base. The riser when not erected lies flat above the base. The rotatable reel swings approximately 90° allowing the complete unit to fit compactly into storage such as a fishing box or a five gallon bucket. Most tip ups require the sportsman's gloves to be removed to catch fish which this tip up does not. The unique grove in the inner core taper of the reel allows for a more reliable strike indication. It also provides a graduated measuring scale on the top surface of the flexible riser.

What is claimed is:

1. A tip-up for ice fishing comprising in combination;
 a base, said base having a distal end and a near end and having mounted on said base, near the distal end, a cross member; said cross member having a median point and said cross member having attached at the median point a slidable bracket that is slidable along said base; said cross member being capable of locking to the base at the distal end of said base; said base being equipped with a non-slip surface;

a flexible riser mounted near the near end of said base, said flexible riser having a top surface, a bottom surface, a first side, a second side, a near end and a distal end; a ruled top surface, said near end of flexible riser being provided with a pull tab locking notch;

a pull tab erector being mounted on the top surface of said flexible riser, said pull tab erector having a near end, a distal end, a first side, a second side, a top surface and a bottom surface; said bottom surface at the distal end of the pull tab erector being attached to the top surface of the flexible riser; said near end of the pull tab erector being notched on said first side and said second side to fit into the near end of said pull tab locking notch; said pull tab erector being extendable to fit into the flexible riser near end locking notch;

a rotatable reel with a rotatable spool is surmounted on the distal end of the pull tab erector; said reel having an outer casing; said outer casing having an outer surface; an inner surface; a near end; a distal end; an opening therethrough and a reel handle lock in the near end of the outer casing; a removable inner core having a near end and a distal end; a handle mounted to said near end of said inner core; the inner core distal end being tapered; said taper having a groove therein; said inner core having two circular protrusions that ride on the inner surface of the outer casing; said rotatable reel having the ability to swing inward at least 90° when the handle is in the up position; said reel inner core being removable; said inner core being confined to the inner surface of the reel by a reel core lock; said reel core lock being mounted to the outer surface of the reel; the reel core lock having a top surface; a bottom surface; a distal end and a near end forming a tab; there being an opening through the top surface of the reel core lock;

a reel stop/lock being mounted near the distal end of the outer casing of said reel to prevent the reel from rotating a distance greater than 90°;

there being mounted on the flexible riser essentially at its median point and near the second side, a flexible flag; there being present a notch in the flexible riser above the flexible flag to provide storage for said flexible flag; and there being a hole through the distal end of the flexible riser top surface to accommodate a fishing line.

2. A tip up as claimed in claim 1 further comprising a flexible tube having a top end and a bottom end; the top end of said flexible tube depending downwardly through an opening through the base and continuing through the top surface of a self-adjusting ice shield; said self adjusting ice shield having a top surface; a bottom surface and an outer edge; said flexible tube passing through a washer; said washer having a top surface and a bottom surface; said flexible tube terminating at the bottom surface of the washer and supporting said self adjusting ice shield.

3. A device as claimed in claim 1 where in a graduated measuring scale is secured inside to the base unit that can be used in conjunction with the ruled top surface of the flexible riser.

4. A device as claimed in claim 1 wherein the device is collapsible.

5. A device as claimed in claim 1 wherein the reel can be set to allow adjustable run out.

6. A device as claimed in claim 1 where flexible riser is undulatble in wind to give a natural jigging action.

7. A device as claimed in claim 1 where in there is a grove in the tapered end of the inner reel core.

8. A device as claimed in claim 1, where in the base is equipped with a non-slip surface.

9. A tip-up for ice fishing comprising in combination;

a base, said base having a distal end and a near end and having mounted on said base, near the distal end, a cross member; said cross member having a median point and said cross member having attached at the median point a slidable bracket that is slidable along said base; said cross member being capable of locking to the base at the distal end of said base;

a flexible riser mounted near the near end of said base, said flexible riser having a top surface, a bottom surface, a near end and a distal end; said near end of flexible riser being provided with a pull tab locking notch;

a pull tab erector being mounted on the top surface of said flexible riser, said pull tab erector having a near end, a distal end, a first side, a second side, a top surface and a bottom surface; said bottom surface at the distal end of the pull tab erector being attached to the top surface of the flexible riser; said near end of the pull tab erector being notched on said first side and said second side to fit into the near end of said pull tab locking notch; said pull tab erector being extendable to fit into the flexible riser pull tab locking notch;

a reel holder, said reel holder having a distal end and a near end, said distal end and near ends having a means of attaching the reel holder to the pull tab erector such that the distal end and the near end of the reel holder are parallel and aligned with the distal end and the near end of the base;

said reel holder having a pivot tab unitarily mounted adjacent to the near end thereof, said pivot tab having a centered hole therein;

a trigger, said trigger having a single coil spring configuration wherein both ends of the coil spring are elongated, said single coil spring being mounted on the pivot tab such that the center of the spring is aligned with the centered hole of the pivot tab, said trigger being mounted with a shouldered pin such that the trigger rotates around the pin;

a rotatable reel with a rotatable spool is surmounted on the distal end of the pull tab erector; said reel having an upstanding spool bracket on which is mounted a fishing spool for containing fishing line thereon, said spool comprising a pair of parallel aligned spaced-apart circular plates that are integrally connected by a hollow spindle shaft member;

there being mounted on the flexible riser essentially at its median point and near the second side, a flexible flag; there being present a notch in the flexible riser above the flexible flag to provide storage for said flexible flag;

there being a hole through the distal end of the flexible riser top surface to accommodate a fishing line.

10. A tip up as claimed in claim 9 further comprising a flexible tube having a top end and a bottom end; the top end of said flexible tube depending downwardly through an opening through the base and continuing through the top surface of a self-adjusting ice shield; said self adjusting ice shield having a top surface; a bottom surface and an outer edge; said flexible tube passing through a washer; said washer having a top surface and a bottom surface; said flexible tube terminating at the bottom surface of the washer and supporting said self adjusting ice shield.

* * * * *